(12) United States Patent
Wei et al.

(10) Patent No.: US 11,004,272 B2
(45) Date of Patent: May 11, 2021

(54) IMAGE PROCESSING METHOD, ELECTRONIC APPARATUS, AND STORAGE MEDIUM

(71) Applicant: TENCENT TECHNOLOGY (SHENZHEN) COMPANY LTD, Guangdong (CN)

(72) Inventors: Jia Wei, Shenzhen (CN); Ying Sha, Shenzhen (CN); Zhechuan Zhang, Shenzhen (CN); Hong Zhang, Shenzhen (CN); Xiao Pan, Shenzhen (CN); Chuankang Fan, Shenzhen (CN); Xiaowei Fan, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 0 days.

(21) Appl. No.: 16/655,356

(22) Filed: Oct. 17, 2019

(65) Prior Publication Data
US 2020/0051339 A1 Feb. 13, 2020

Related U.S. Application Data

(63) Continuation of application No. PCT/CN2018/114167, filed on Nov. 6, 2018.

(30) Foreign Application Priority Data

Nov. 23, 2017 (CN) .......................... 201711184883.6

(51) Int. Cl.
*G06T 19/00* (2011.01)
*G06T 7/70* (2017.01)
(Continued)

(52) U.S. Cl.
CPC ........ *G06T 19/006* (2013.01); *G06K 9/00523* (2013.01); *G06K 9/6267* (2013.01);
(Continued)

(58) Field of Classification Search
None
See application file for complete search history.

(56) References Cited

U.S. PATENT DOCUMENTS 8,988,464 B2 3/2015 Kim et al.
10,102,656 B2 10/2018 Lee et al.
(Continued)

FOREIGN PATENT DOCUMENTS

CN 102156808 A 8/2011
CN 102646275 A 8/2012
(Continued)

OTHER PUBLICATIONS

International Search Report for PCT/CN2018/114167 dated Feb. 1, 2019 (PCT/ISA/210).
(Continued)

*Primary Examiner* — Peter Hoang
(74) *Attorney, Agent, or Firm* — Sughrue Mion, PLLC

(57) ABSTRACT

An image processing method, performed by an electronic apparatus is provided. A captured image is obtained. Subject information of a subject is extracted among at least one subject, from the captured image. A virtual item corresponding to the subject is determined according to the subject information of the subject. Coordinate information of the virtual item is determined according to the subject information of the subject and the captured image. A virtual scene is generated according to the coordinate information, the virtual item, and the captured image.

17 Claims, 9 Drawing Sheets

(51) Int. Cl.
  *G06K 9/00* (2006.01)
  *G06T 19/20* (2011.01)
  *G06K 9/62* (2006.01)

(52) U.S. Cl.
  CPC .............. *G06T 7/70* (2017.01); *G06T 19/20* (2013.01); *G06T 2219/2004* (2013.01)

(56) References Cited

U.S. PATENT DOCUMENTS

| | | | |
|---|---|---|---|
| 2014/0217178 | A1 | 8/2014 | Zhou et al. |
| 2016/0019723 | A1* | 1/2016 | Tapley .................. G06T 19/006 345/633 |
| 2017/0031503 | A1* | 2/2017 | Rosenberg ............. G06F 3/017 |
| 2017/0357407 | A1* | 12/2017 | Palmaro ............. G06F 3/04845 |
| 2018/0045963 | A1* | 2/2018 | Hoover ................... G06F 3/011 |

FOREIGN PATENT DOCUMENTS

| | | |
|---|---|---|
| CN | 103310099 A | 9/2013 |
| CN | 103366610 A | 10/2013 |
| CN | 104270577 A | 1/2015 |
| CN | 104656901 A | 5/2015 |
| CN | 105975080 A | 9/2016 |
| CN | 106200914 A | 12/2016 |
| CN | 106355153 A | 1/2017 |
| CN | 106383587 A | 2/2017 |
| CN | 107065164 A | 8/2017 |
| CN | 107272889 A | 10/2017 |
| CN | 108022301 A | 5/2018 |
| KR | 1020120066233 A | 6/2012 |
| KR | 1020160007473 A | 1/2016 |

OTHER PUBLICATIONS

Communication dated Oct. 21, 2019 from the State Intellectual Property Office of the P.R.C. in counterpart Application No. 201711184883.6.

Written Opinion issued from the International Bureau in Application No. PCT/CN2018/114167, dated Feb. 1, 2019.

Communication dated Nov. 18, 2020, issued by the Korean Intellectual Property Office in Korean Application No. 10-2019-7036057.

* cited by examiner

IMAGE PROCESSING METHOD, ELECTRONIC APPARATUS, AND STORAGE MEDIUM

CROSS-REFERENCE TO RELATED APPLICATION(S)

This application is a continuation application of International Application No. PCT/CN2018/114167, filed on Nov. 6, 2018, which claims priority to Chinese Patent Application No. 201711184883.6, entitled "IMAGE PROCESSING METHOD, ELECTRONIC APPARATUS, AND APPARATUS, AND STORAGE MEDIUM" and filed with the Chinese Patent Office on Nov. 23, 2017, the disclosures of which are incorporated by reference in their entireties.

BACKGROUND

1. Field

Example embodiments of the disclosure relate to the field of computer technologies, and in particular, to an image processing method, an electronic apparatus and a storage medium.

2. Description of the Related Art

Augmented Reality (AR) is a technology of calculating positions and angles of camera images in real time and adding corresponding images, videos, and three-dimensional models. This technology is intended to put the virtual world on the screen and interact with the virtual world in the real world.

An AR game is an electronic game in which a real environment and virtual items are superimposed in real time on the same screen or in the same space, so that users can fully perceive and manipulate virtual stereoscopic images. The implementation of AR games requires game hardware devices with a camera, and the hardware device includes but is not limited to a computer, a mobile phone, a game console, an AR helmet, AR glasses and the like. An existing AR game mainly identifies image information on the game card through a camera, and then renders items, for example, three-dimensional models such as a sailboat and a sprite, corresponding to the image information into a real scene. The existing AR game cannot identify a plurality of game cards at the same time. As a result, only one or one group of specific game items can be presented in a single game. Therefore, only simple interactions are permitted, and the game content is limited.

SUMMARY

One or more example embodiments provide an image processing method and apparatus, a storage medium, and an electronic apparatus.

According to an aspect of an example embodiment, there is provided an image processing method, performed by an electronic apparatus is provided. A captured image is obtained. Subject information of a subject is extracted among at least one subject, from the captured image. A virtual item corresponding to the subject is determined according to the subject information of the subject. Coordinate information of the virtual item is determined according to the subject information of the subject and the captured image. A virtual scene is generated according to the coordinate information, the virtual item, and the captured image.

The determining the virtual item may include: extracting feature information from the subject information; determining, according to the feature information, an item identifier corresponding to the subject; and obtaining, from a stored virtual item library, the virtual item corresponding to the subject according to the item identifier.

The determining the coordinate information of the virtual item may include: detecting a display position of the at least one subject in the captured image; selecting a target subject from the at least one subject according to the display position; and determining the coordinate information of the virtual item according to the target subject and the display position.

The selecting the target subject may include: determining as the target subject, from among the at least one subject, a subject of which the display position is closest to a preset edge of the captured image.

The determining the coordinate information of the virtual item may include: creating a three-dimensional coordinate system based on the display position of the target subject as a coordinate origin; and obtaining coordinate information of each display position in the three-dimensional coordinate system as the coordinate information of the virtual item.

The generating the virtual scene may include: superimposing the virtual item on the captured image according to the coordinate information to generate the virtual scene.

The superimposing may include: determining a target scene image in a stored scene image library according to the item identifier; superimposing the target scene image on the captured image according to the coordinate information; and superimposing the virtual item on the target scene image according to the coordinate information.

The method may further include, after the superimposing the virtual item on the target scene image: obtaining, for each piece of the coordinate information of the virtual item, a difference set based on differences between each piece of the coordinate information and remaining pieces of the coordinate information; detecting variations of the differences in each difference set; and updating the virtual scene based on the variations.

The updating may include: obtaining a number of an occurrence in which the variations of the differences in each difference set is equal to zero; determining a target difference set, from among a plurality of difference sets for the virtual item, according to the obtained number of the occurrence; and fixing the target scene image in the virtual scene by using coordinate information corresponding to the target difference set as an anchor.

The updating may include: obtaining differences having variations greater than zero in each difference set; determining whether a difference less than or equal to a preset threshold exists in the obtained differences; determining, based on the difference existing, coordinate information corresponding to the difference less than or equal to the preset threshold as interactive object coordinate information, and determining an item identifier corresponding to the interactive object coordinate information as an interactive object identifier; and updating the virtual item superimposed on the target scene image according to the interactive object coordinate information and the interactive object identifier.

The updating the virtual item superimposed on the target scene image may include: obtaining, according to the interactive object identifier, an item parameter corresponding to the virtual item; calculating an interactive value according to the item parameter and the interactive object coordinate information; and updating the item parameter according to the interactive value to update the virtual item.

The calculating the interactive value may include: determining a target interactive function according to the difference less than or equal to the preset threshold; and calculating the interactive value according to the target interactive function, the item parameter, and the interactive object coordinate information.

According to an aspect of an example embodiment, there is provided an electronic apparatus including at least one memory operable to store program code; and at least one processor operable to read the program code and operate as instructed by the program code. The program code includes: obtaining code configured to cause at least one of the at least one processor to obtain a captured image; extracting code configured to cause at least one of the at least one processor to extract subject information of a subject, among at least one subject, from the captured image; first determining code configured to cause at least one of the at least one processor to determine a virtual item corresponding to the subject according to the subject information of the subject; second determining code configured to cause at least one of the at least one processor to determine coordinate information of the virtual item according to the subject information of the subject and the captured image; and generating code configured to cause at least one of the at least one processor to generate a virtual scene according to the coordinate information, the virtual item, and the captured image.

The first determining code may include: code configured to cause at least one of the at least one processor to extract feature information from the subject information; code configured to cause at least one of the at least one processor to determine, according to the feature information, an item identifier corresponding to the subject; and code configured to cause at least one of the at least one processor to obtain, from a stored virtual item library, the virtual item corresponding to the subject according to the item identifier.

The second determining code may include: code configured to cause at least one of the at least one processor to detect a display position of the at least one subject in the captured image; code configured to cause at least one of the at least one processor to select a target subject from the at least one subject according to the display position; and code configured to cause at least one of the at least one processor to determine the coordinate information of the virtual item according to the target subject and the display position.

The generating code may include: code configured to cause at least one of the at least one processor to superimpose the virtual item on the captured image according to the coordinate information to generate the virtual scene.

According to an aspect of an example embodiment, there is provided a non-volatile computer readable storage medium, storing a plurality of computer readable instructions executable by one or more processors to perform: obtaining a captured image; extracting subject information of a subject, among at least one subject, from the captured image; determining a virtual item corresponding to the subject according to the subject information of the subject; determining coordinate information of the virtual item according to the subject information of the subject and the captured image; and generating a virtual scene according to the coordinate information, the virtual item, and the captured image.

In determining the virtual item, the plurality of computer readable instructions may be executable by the one or more processors to further perform: extracting feature information from the subject information; determining, according to the feature information, an item identifier corresponding to the subject; and obtaining, from a stored virtual item library, the virtual item according to the item identifier.

In determining the coordinate information of the virtual item, the plurality of computer readable instructions may be executable by the one or more processors to further perform: detecting a display position of the at least one subject in the captured image; selecting a target subject from the at least one subject according to the display position; and determining the coordinate information of the virtual item according to the target subject and the display position.

In generating the virtual scene, the plurality of computer readable instructions may be executable by the one or more processors to further perform: superimposing the virtual item on the captured image according to the coordinate information to generate the virtual scene.

BRIEF DESCRIPTION OF THE DRAWINGS

These and/or other aspects will become apparent and more readily appreciated from the following description of the embodiments, taken in conjunction with the accompanying drawings. Apparently, the accompanying drawings in the following description show only some embodiments, and a person of ordinary skill in the art may still derive other drawings from these accompanying drawings without creative efforts.

DETAILED DESCRIPTION

The following clearly and completely describes the technical solutions in the example embodiments of the disclosure with reference to the accompanying drawings. Apparently, the described embodiments are some of the embodiments of the disclosure rather than all of the embodiments. All other embodiments obtained by a person of ordinary skill in the art based on the embodiments of the disclosure without creative efforts shall fall within the protection scope of the disclosure.

The example embodiments of the disclosure provide an image processing method and apparatus, and a storage medium, which are described respectively in detail in the following.

Figure 1:
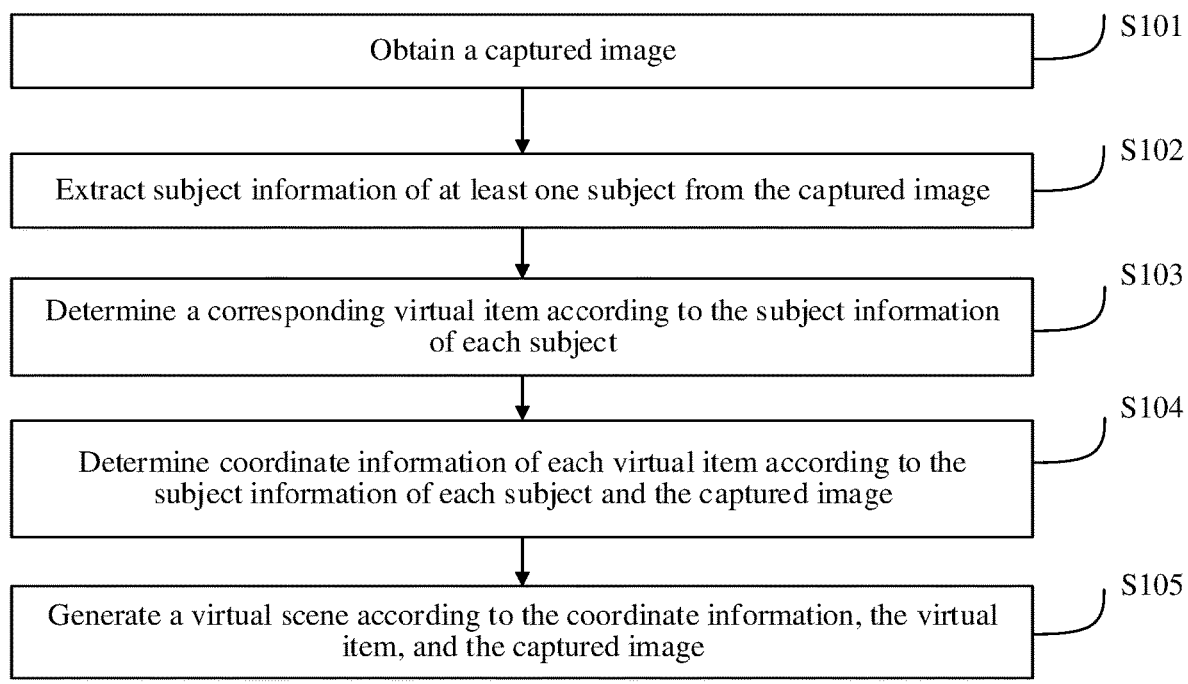
FIG. 1 is a schematic flowchart of an image processing method according to an example embodiment.

The image processing method includes: obtaining a captured image; extracting subject information of a subject from the captured image; determining, according to the subject information, a virtual item corresponding to the subject; determining coordinate information of each virtual item according to the subject information and the captured image; and generating a virtual scene according to the coordinate information, the virtual item, and the captured image. As shown in FIG. 1, a specific process of the image processing method may include operations S101-S105.

S101: Obtain a Captured Image.

In an example embodiment, the captured image may be obtained by an image acquisition apparatus (such as a camera) built in a terminal. The image acquisition apparatus may be built in an AR game device. The AR game device is mainly applied to an AR game. A quantity of players participating in each AR game may be determined according to a predetermined criterion (or an actual requirement). The quantity may be one or more. When a plurality of players participate in an AR game, an AR game device of one player may be designated as a main device, and an image acquired by the main device may be determined as the captured image.

S102: Extract Subject Information of at Least One Subject from the Captured Image.

In an example embodiment, the subject may be a physical object having a function of referring to a specific virtual item, for example an officially released game card. Each game card corresponds to one virtual item, and the virtual item, for example, a character, a weapon, or a prop in the game, is derived from a virtual network world. Specifically, the subject information may be extracted from the captured image by using a classifier such as a random forest, a support vector machine (SVM) or the like.

S103: Determine a Corresponding Virtual Item According to the Subject Information of Each Subject;

For example, operation S103 may specifically include the following operations.

1-1: Extract Feature Information from the Subject Information.

In an example embodiment, the feature information may include at least one of a color feature, a texture feature, a shape feature, a spatial relationship feature and the like. Different features may be extracted by using different algorithms. For example, the color feature is extracted through a color histogram method, and the texture feature is extracted through a geometric method.

1-2: Determine, According to the Feature Information, an Item Identifier Corresponding to the Subject.

In an example embodiment, the item identifier is a unique identifier of the virtual item. The virtual item may be a stereoscopic image rendered by a three-dimensional model. The item identifier may be a name set by a person when registering the virtual item on a network platform, or a string automatically assigned by a system. Each virtual item (or each group of virtual items) corresponds to one item identifier. Specifically, a user may perform image acquisition on all prepared subjects (such as game cards) in advance and extract feature information, then associate the extracted feature information with the item identifier of the virtual item that the feature information refers to, and store the association (or information about the association relationship). In this way, the corresponding item identifier may be determined according to the feature information.

1-3: Obtain the Corresponding Virtual Item from a Stored Virtual Item Library According to the Item Identifier.

In an example embodiment, the user may set an item identifier for each designed virtual item in advance, and store an association between the item identifier and the virtual item in a virtual item library.

S104: Determine Coordinate Information of Each Virtual Item According to the Subject Information of Each Subject and the Captured Image.

For example, operation S104 may specifically include the following operations.

2-1: Detect a Display Position of the Subject in the Captured Image.

In an example embodiment, the display position of the subject may be a relative position from an upper boundary, a lower boundary, a left boundary, and a right boundary of the captured image. Because the projection of the subject in the captured image is a pixel region instead of a single pixel point, a display position of a center of the pixel region may be used to represent the display position of the subject. This is merely an example and any other manners may also be used, and the disclosure is not limited herein.

2-2: Select a Target Subject from the at Least One Subject According to the Display Position.

In an example embodiment, the target subject may be selected according to a predetermined criterion (or an actual requirement). For example, a subject that is farthest from or closest to a fixed point may be determined as the target subject. The fixed point may be a top left vertex, a center point, a bottom right vertex or the like, and a subject located at a boundary may be selected as the target subject.

For example, operation 2-2 may specifically include the following operations:

determining, in the at least one subject, a subject of which the display position is closest to a preset edge of the captured image; and using the determined subject as the target subject.

In an example embodiment, the preset edge may be any edge set by the user, such as a left edge, a right edge, an upper edge, or a lower edge.

2-3: Determine the Coordinate Information of Each Virtual Item According to the Target Subject and the Display Position.

For example, operation 2-3 may specifically include the following operations:

creating a three-dimensional coordinate system with the display position of the target subject as a coordinate origin; and obtaining coordinate information of each display position in the three-dimensional coordinate system as the coordinate information of the corresponding virtual item.

In an example embodiment, the three-dimensional coordinate system may be created by using the display position of the target subject as a coordinate origin and using a plane in which the captured image is located as a plane in which two coordinate axes (such as an X axis and a Y axis) are located. Then, corresponding three-dimensional coordinate values are determined according to projection positions of each display position relative to the X axis, the Y axis and a Z axis, and the three-dimensional coordinate values are used as the coordinate information of the virtual item. A value of a third coordinate axis (such as the Z axis) in each piece of the coordinate information may be zero.

S105: Generate a Virtual Scene According to the Coordinate Information, the Virtual Item, and the Captured Image.

For example, operation S105 may specifically include the following operation:

superimposing the corresponding virtual item on the captured image according to the coordinate information to generate the virtual scene.

In an example embodiment, the virtual scene refers to a new image generated in a specified common space coordinate system after transformation is performed on a virtual image and a real image. The common space coordinate system mainly refers to the created three-dimensional coordinate system, and the transformation may include superposition. The virtual item in the virtual scene may be directly or indirectly superimposed on the captured image, which is mainly determined according to an actual gaming focus. If the focus is on real environment experience, direct superposition may be used. If the focus is on a presentation of real interactions in the virtual world, indirect superposition may be used.

For example, when the virtual item is superimposed indirectly, the foregoing operation of "superimposing the corresponding virtual item on the captured image according to the coordinate information" may specifically include the following operations.

3-1: Determine a Target Scene Image in a Stored Scene Image Library According to the Item Identifier.

In an example embodiment, scene images of the scene image library are normally designed in advance according to game content, and mainly serve as game backgrounds. Different games may have different scene images. In different games, the virtual items required are different, and each virtual item may be identified by the item identifier. Therefore, a scene image of a currently running game may be determined according to the item identifier of the virtual item.

3-2: Superimpose the Target Scene Image on the Captured Image According to the Coordinate Information.

In an example embodiment, a size and a superposition position of the target scene image may be adjusted according to coordinate information of a virtual item located at an edge, so as to ensure that each virtual item is located above the target scene image.

3-3: Superimpose the Corresponding Virtual Item on the Target Scene Image According to the Coordinate Information.

In an example embodiment, a corresponding position of each piece of coordinate information on the target scene image may be first determined, and then the corresponding virtual item is superimposed at the corresponding position.

After the virtual scene is generated, the virtual scene may be further presented to the user, so that the user can perform an interaction according to the presented image. When the user stands in different positions, visual angles of the user are different as well. When the virtual scene is presented to the user, it is required to flexibly adjust placement directions of the virtual item and the target scene image according to the visual angle of each user, so as to deepen immersive feelings of the users. The visual angle of each user may be obtained from the orientation of the respective acquired background image.

In addition, after the virtual scene is presented to the user, it is also required to track the movement of each subject in real time and update the corresponding virtual scene according to the movement. That is, after operation 3-3, the image processing method may further include the following operations:

obtaining differences between each piece of the coordinate information and the remaining pieces of the coordinate information to obtain a difference set, where each piece of the coordinate information corresponds to one difference set;

detecting variations of differences in each difference set; and updating the virtual scene based on the variations.

In an example embodiment, the difference is a coordinate difference between two virtual items, and the variation of the difference may reflect the relative movement between the two virtual items, such as relative movement or relative rotation. Once the detected variation is not zero, it is required to fix the game scene according to coordinate information of a virtual item that has not moved and update the virtual item according to coordinate information of the virtual item that has moved.

For example, when a presentation of the target scene image needs to be fixed according to the virtual item that has not moved, the foregoing operation of "updating the virtual scene based on the variations" may include the following operations:

obtaining a quantity of differences having variations equal to zero in each difference set (or obtaining a number of an occurrence in which variations of differences in each difference set is equal to zero);

determining a target difference set in the difference sets according to the obtained quantity (or obtained number of the occurrence); and fixing the target scene image in the virtual scene by using coordinate information corresponding to the target difference set as an anchor.

In an example embodiment, that the variation is equal to 0 (that is, no relative movement occurs) may be based on two situations: both of the two virtual items move at an equal distance simultaneously; or neither of the two virtual items moves. In this case, the virtual items that have not moved may further be determined according to the quantity of the differences having the variations equal to 0. For example, a difference set having a top ranking quantity (that is, having the highest quantity of differences having variations equal to zero relative to most of the virtual items) may be determined as the target difference set, a virtual item corresponding to the target difference set is determined as the virtual item that has not moved, and coordinates of the virtual item are used as anchors to continue to fix the target scene image.

When the virtual item needs to be updated according to the coordinate information of the virtual item that has moved, the foregoing operation of "updating the virtual scene based on the variations" may include the following operations:

obtaining all differences with variations greater than zero in each difference set;

determining whether a difference less than or equal to a preset threshold exists in all the obtained differences;

determining, in a case that the difference less than or equal to the preset threshold exists, the coordinate information corresponding to the difference less than or equal to the preset threshold as interactive object coordinate information, and determining an item identifier corresponding to the interactive object coordinate information as an interactive object identifier; and updating the virtual item superimposed on the target scene image according to the interactive object coordinate information and the interactive object identifier.

In an example embodiment, not all the virtual items that have moved need to be updated, and updates are only necessary if there is an interaction between two virtual items. The preset threshold is mainly used to define an interactive status and a non-interactive status, and a specific value may be determined according to a predetermined criterion. The interactive modes in the interactive status may include approaching, zooming, colliding, rotating and the like. Different interactive modes usually indicate different interactive instructions. For example, approaching may indicate attack, zooming may indicate withdrawal, and rotating may indicate defense, in the context of playing the AR game. The same interactive mode may also indicate different interactive instructions in different games.

When a distance between two virtual items is within the preset threshold, the two virtual items may be defined as being in an interactive status. In this case, an interactive mode needs to be further determined according to the distance value between both parties, and the virtual item needs to be updated according to the interactive mode. That is, the foregoing operation of "updating the virtual item superimposed on the target scene image according to the interactive object coordinate information and the interactive object identifier" may specifically include the following operations.

4-1: Obtain, According to the Interactive Object Identifier, an Item Parameter Corresponding to the Virtual Item.

In an example embodiment, the item parameter mainly includes an attribute parameter of the virtual item, for example, an attack range value, an attack damage value, a defense value, a life value of different characters in the game.

4-2: Calculate an Interactive Value According to the Item Parameter and the Interactive Object Coordinate Information.

For example, operation 4-2 may specifically include the following operations:

determining a target interactive function according to the difference less than or equal to the preset threshold; and calculating the interactive value according to the target interactive function, the item parameter, and the interactive object coordinate information.

In an example embodiment, different distances between two virtual items correspond to different interactive modes, and each interactive mode has a specified interactive function to calculate the interactive value. The interactive functions are generally preset by the user and stored in a database in association with a specified distance range, so that the corresponding interactive function may be determined according to the distance subsequently.

4-3: Update the Corresponding Item Parameter According to the Interactive Value to Update the Virtual Item.

In an example embodiment, a method for updating the item parameter may be determined according to a predetermined criterion, for example, a simple addition and subtraction method, that is, adding or subtracting the interactive value on the item parameter. Normally, different interactive values have different interactive influences on virtual items, and a larger interactive value indicates a greater interactive influence. Different interactive influences lead to different interactive results including defeat, death, blood loss of the virtual item (e.g., a character) in the game, and each interactive result needs to be determined according to updated item parameters. For example, if a life value of a virtual item is 0 after interaction, the interactive result of the virtual item means death of the virtual item (e.g., a character). In addition, for different interactive results, different images of the virtual item may be presented. For example, a death effect may be generated around the virtual item when the interactive result is death, and a blood box above the virtual item may be changed when the interactive result is blood loss.

As can be learned from the above, in the image processing method provided in an example embodiment, a captured image is obtained, subject information of at least one subject is extracted from the captured image, a virtual item corresponding to the subject is determined according to the subject information, coordinate information of each virtual item is determined according to the subject information and the captured image, and a virtual scene is generated according to the coordinate information, the virtual item, and the captured image, to present the corresponding virtual item in a real scene according to relative positional relationships of a plurality of real items. In this way, construction of large game scenes is implemented, game interactive modes are enriched, and high flexibility is provided.

According to the method described in the foregoing example embodiment, the following further provides detailed description of the example embodiment by using examples.

Herein, an image processing apparatus integrated in an electronic apparatus is used as an example for detailed description.

Figure 2A:
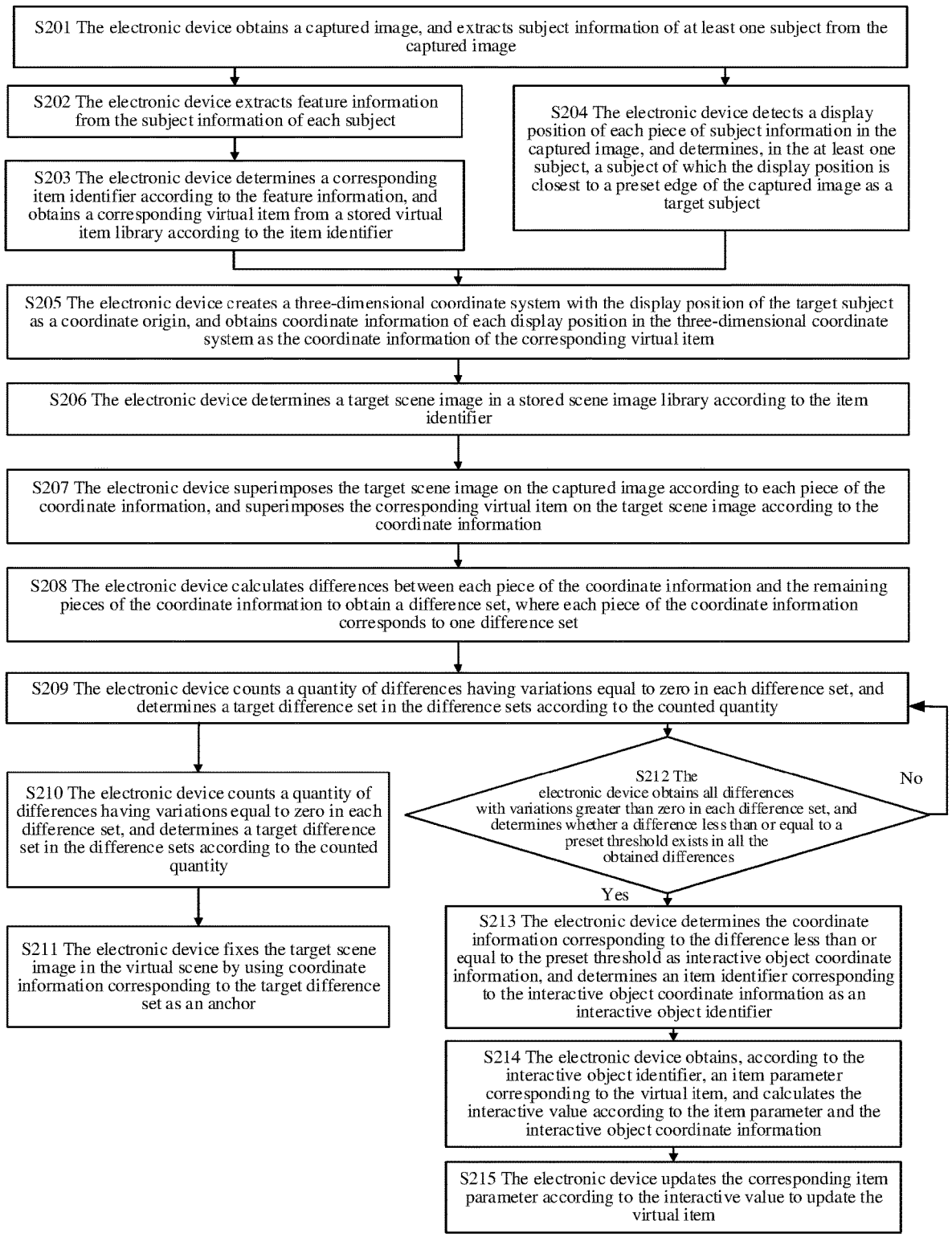
FIG. 2a is a schematic flowchart of an image processing method according to an example embodiment.

As shown in FIG. 2a, a specific process of an image processing method may include operations S201-S215.

S201: The Electronic Apparatus Obtains a Captured Image, and Extracts Subject Information of at Least One Subject from the Captured Image.

Figure 2B:
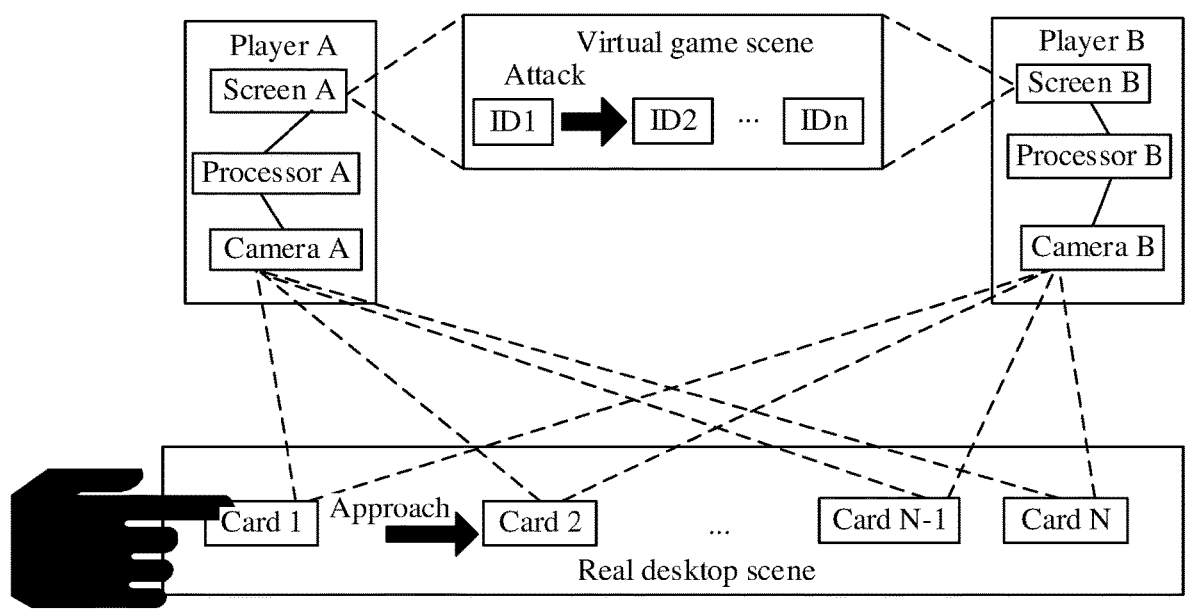
FIG. 2b is a schematic diagram of an AR game interactive scene according to an example embodiment.

For example, referring to FIG. 2b, players that participate in an AR game simultaneously include a player A and a player B. Players A and B respectively wear AR game devices, and each AR game device acquires image information in real time. In this case, if the player A is a main control player, an image acquired by an AR game device of the player A may be determined as the captured image. Then, the electronic apparatus may perform background removal by using an SVM classifier and extract the subject information.

S202: The Electronic Apparatus Extracts Feature Information from the Subject Information of Each Subject.

For example, if the subject includes game cards {card 1, card 2, . . . card N−1, card N}, feature information corresponding to each card may be extracted, and the feature information may include at least one of a color feature, a texture feature, a shape feature, a spatial relationship feature and the like.

S203: The electronic apparatus determines a corresponding item identifier according to the feature information, and obtains a corresponding virtual item from a stored virtual item library according to the item identifier.

For example, the item identifier may include {ID 1, ID 2, ID 3 . . . ID n}, and each item identifier may be a string assigned by a system. The virtual item may be an item derived from a virtual network game world, such as a character or a weapon in a game, and each virtual item is designed to be presented to the user through a stereoscopic image.

S204: The electronic apparatus detects a display position of the subject from each piece of subject information in the captured image, and determines, from among the at least one subject, a subject of which the display position is closest to a preset edge of the captured image as a target subject.

For example, a position of a central projection point of each subject on the image may be defined as the display position, and a subject of which the display position is closest to a lower left corner of a frame may be determined as the target subject.

S205: The electronic apparatus creates a three-dimensional coordinate system with the display position of the target subject as a coordinate origin, and obtains coordinate information of each display position in the three-dimensional coordinate system as the coordinate information of the corresponding virtual item.

For example, the three-dimensional coordinate system may be created by using the display position of the target subject as a coordinate origin and using a plane in which the captured image is located as a plane in which an X axis and a Y axis are located. In this case, the display position of the target subject is (0, 0, 0), and a value of each display position on a vertical axis Z is 0.

S206: The Electronic Apparatus Determines a Target Scene Image in a Stored Scene Image Library According to the Item Identifier.

For example, game content that needs to be run may be determined in combination with a current virtual item, and then a corresponding scene image is obtained as a target scene image. For example, if the current virtual item includes a plurality of battleships having different types, it may be determined that the game is a naval battle game, and then a scene image corresponding to the naval battle game may be determined as the target scene image.

S207: The electronic apparatus superimposes the target scene image on the captured image according to each piece of the coordinate information, and superimposes the corresponding virtual item on the target scene image according to the coordinate information.

Figure 2C:
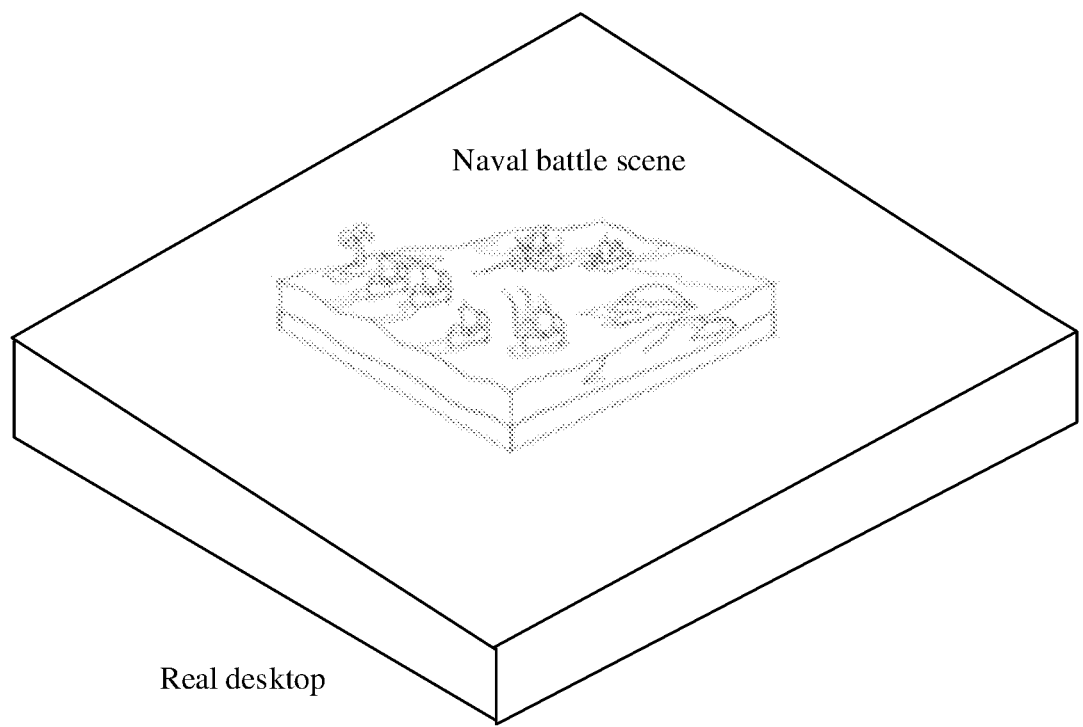
FIG. 2c is a schematic diagram of a virtual scene of a naval battle game according to an example embodiment.

For example, referring to FIG. 2c, a size of a naval battle scene image may be adjusted according to coordinate information of a battleship located at an edge, so as to ensure that each battleship can be located above the naval battle scene image. Then the naval battle scene image is superimposed on the captured image, and battleships are superimposed on the naval battle scene by using coordinates of a central point of the subject as coordinates of a central point of the battleship projection.

S208: The electronic apparatus obtains differences between each piece of the coordinate information and the remaining pieces of the coordinate information to obtain a difference set, where each piece of the coordinate information corresponds to one difference set.

For example, a coordinate difference between each battleship and another battleship may be calculated. For battleships that move on the same sea level, the coordinate difference between two battleship may be a relative distance between the two battleships.

S209: The Electronic Apparatus Detects Variations of Differences in Each Difference Set.

For example, the virtual scene needs to be updated when any battleship moves. For example, it is required to continue to fix the game scene according to coordinate information of a battleship that has not moved, and update the virtual item according to a battleship that has moved. Therefore, the variation of a distance of each battleship relative to another battleship needs to be detected in real time, and whether the battleship has moved is determined according to the variation.

S210: The electronic apparatus obtains a quantity of differences having variations equal to zero in each difference set, and determines a target difference set in all the difference sets according to the obtained quantity.

For example, that the variation of the difference is equal to 0 (that is, no relative movement occurs) may have two situations: both of the two battleships corresponding to the difference move at an equal distance simultaneously; or neither of the two battleships moves. In this case, battleships that have not moved may be further determined according to the quantity of differences having variations equal to zero. For example, a difference set in which the quantity of differences having variations equal to zero exceeds a specified value may be determined as the target difference set, and battleships corresponding to the target difference set are the battleships that have not moved.

S211: The Electronic Apparatus Fixes the Target Scene Image in the Virtual Scene by Using Coordinate Information Corresponding to the Target Difference Set as an Anchor.

For example, a game scene may be fixed by using coordinate information of a battleship that has not moved as an anchor. That is, it is ensured that relative positions of the game scene and the battleship that has not moved remain unchanged, and coordinate information of another battleship that has moved is updated by using the coordinate information as a reference.

S212: The electronic apparatus obtains all differences with variations greater than zero in each difference set, and determines whether a difference less than or equal to a preset threshold exists in all the obtained differences, in a case that the difference exists, performs operation S213 to operation S215, and in a case that the difference does not exist, goes back to perform operation S209.

For example, the preset threshold may be 1 cm. That is, when the distance between the two battleships is less than 1 cm on the screen, it may be determined that the two battleships have interacted. The interactive mode may include approaching, zooming, colliding, rotating and the like. When the distance between the two battleships is greater than 1 cm, it may be determined that the two battleships have not interacted.

S213: The electronic apparatus determines the coordinate information corresponding to the difference less than or equal to the preset threshold as interactive object coordinate information, and determines an item identifier corresponding to the interactive object coordinate information as an interactive object identifier.

For example, when the distance between the two battleships is less than 1 cm, that is, when the two battleships interact, coordinate information and item identifiers of the two battleships may be obtained. For example, the two battleships that have interacted correspond to the item identifiers ID 1 and ID 2.

S214: The electronic apparatus obtains, according to the interactive object identifier, an item parameter corresponding to the virtual item, and calculates the interactive value according to the item parameter and the interactive object coordinate information.

For example, the item parameters of the virtual items corresponding to the item identifiers ID1 and ID2 may be obtained separately. The item parameter may include an attack damage value, a defense value, a life value and the like of the virtual items (e.g., character). Then the interactive mode is determined according to the relative distance between virtual items corresponding to the item identifiers ID1 and ID2. The interactive mode may include approaching, zooming, colliding, rotating and the like. Different relative distances may represent different interactive modes, and each interactive mode has a specified interactive function to calculate the interactive value. The interactive value may refer to a damage value, that is applied to an injured party. A smaller relative distance or a greater attack damage value of an attacker may represent greater damage to a defender, and a larger relative distance or a greater defense value of the defender may represent less damage received by the defender. For example, when the virtual item corresponding to the item identifier ID1 approaches the virtual item corresponding to the item identifier ID2, if a relative distance therebetween is reduced to 5 cm, the interactive mode may be considered to be "approaching". In this case, an interactive function corresponding to the "approaching" is obtained, and the attack value of ID1 and the defense value of ID2 are used by the interactive function to calculate the damage value.

S215: The Electronic Apparatus Updates the Corresponding Item Parameter According to the Interactive Value to Update the Virtual Item.

For example, a latest life value may be obtained by subtracting the damage value from a life value corresponding to a battleship of the defender, and the virtual item is updated according to the latest life value. When the life value is 0, death (or destruction) of the battleship is announced, and the battleship is removed from the virtual scene.

The disclosure is not limited to any sequential order between operations in FIG. 2a, e.g., operations S210 to S211 and operations S212 to S215. In an example embodiment, a procedure of operations S210 to S211 and a procedure of operations S212 to S215 may be performed simultaneously.

As can be learned from the above, in the image processing method provided by an example embodiment, the electronic apparatus obtains a captured image, and extracts subject information of at least one subject from the captured image. Then, the electronic apparatus extracts feature information from the subject information, determines, according to the feature information, an item identifier corresponding to the subject, and obtains a corresponding virtual item from a stored virtual item library according to the item identifier. The electronic apparatus detects a display position of the subject in the captured image, and obtains a subject of which the display position is closest to a preset edge of the captured image as a target subject, and creates a three-dimensional coordinate system with the display position of the target subject as a coordinate origin, and obtains coordinate information of each display position in the three-dimensional coordinate system as the coordinate information of the corresponding virtual item.

Next, the electronic apparatus determines a target scene image in a stored scene image library according to the item identifier, superimposes the target scene image on the captured image according to each piece of the coordinate information, and superimposes the corresponding virtual item on the target scene image according to the coordinate information, so as to present the corresponding virtual item in a real scene according to relative positional relationships of a plurality of real items and implement construction of large game scenes.

Next, the electronic apparatus may calculate differences between each piece of the coordinate information and the remaining pieces of the coordinate information to obtain a difference set, where each piece of the coordinate information corresponds to one difference set, and detect variations of differences in each difference set. The electronic apparatus counts a quantity of differences having variations equal to zero in each difference set, and determines a target difference set in the difference sets according to the counted quantity. The electronic apparatus then fixes the target scene image in the virtual scene by using coordinate information corresponding to the target difference set as an anchor. At the same time, the electronic apparatus obtains all differences with variations greater than zero in each difference set, and determines whether a difference less than or equal to a preset threshold exists in all the obtained differences. In a case that the difference less than or equal to the preset threshold exists, the electronic apparatus determines the coordinate information corresponding to the difference less than or equal to the preset threshold as interactive object coordinate information, and determines an item identifier corresponding to the coordinate information of the interactive object as an interactive object identifier.

Next, the electronic apparatus obtains, according to the interactive object identifier, an item parameter corresponding to the virtual item, and calculates the interactive value according to the item parameter and the interactive object coordinate information. Then, the electronic apparatus updates the corresponding item parameter according to the interactive value to update the virtual item. In this way, the virtual scene can be updated in real time according to operational information of the player in a real environment, interactions between the virtual world and the real world and between players are implemented, game interactive modes are enriched, and high flexibility and good experience are provided.

According to the method described in the foregoing embodiment, an example embodiment provides further description from the perspective of an image processing apparatus. The image processing apparatus may be specifically implemented as an independent entity or integrated into an electronic apparatus such as a terminal or a server. The terminal may include a smartphone, a tablet computer, a personal computer and the like.

Figure 3A:
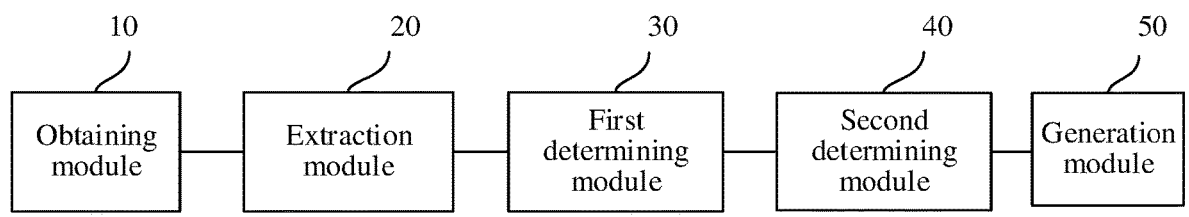
FIG. 3a is a schematic structural diagram of an image processing apparatus according to an example embodiment.

FIG. 3a illustrates an image processing apparatus according to an example embodiment. The image processing apparatus may include: an obtaining module 10, an extraction module 20, a first determining module 30, a second determining module 40 and a generation module 50.

(1) Obtaining Module 10

The obtaining module 10 is configured to obtain a captured image.

In an example embodiment, the obtaining module 10 may obtain the captured image by using an image acquisition apparatus (such as a camera) built in a terminal. The image acquisition apparatus may be built in an AR game device. The AR game device is mainly applied to an AR game. A quantity of players participating in each AR game may be determined according to a predetermined criterion (or an actual requirement). The quantity may be one or more. When a plurality of players participates in an AR game, an AR game device of one player may be designated as a main device, and an image acquired by the main device may be determined as the captured image.

(2) Extraction Module 20

The extraction module 20 is configured to extract subject information of at least one subject from the captured image.

In an example embodiment, the subject may be a physical object having a function of referring to a specific virtual item, for example an officially released game card. Each game card corresponds to one virtual item, and the virtual item, for example, a character, a weapon, or a prop in the game, is derived from a virtual network world. Specifically, the subject information may be extracted from the captured image by using a classifier such as a random forest, a support vector machine (SVM) or the like.

(3) First Determining Module 30

The first determining module 30 is configured to determine a virtual item corresponding to the subject according to the subject information.

For example, the first determining module 30 may be specifically configured to:

1-1. Extract Feature Information from the Subject Information.

In an example embodiment, the feature information may include at least one of color features, texture features, shape features, and spatial relationship features. Different features may be extracted by using different algorithms. For example, the color features are extracted through color histogram method, and the texture features are extracted through a geometric method.

1-2. Determine, According to the Feature Information, an Item Identifier Corresponding to the Subject.

In an example embodiment, the item identifier is a unique identifier of the virtual item. The virtual item may be a stereoscopic image rendered by a three-dimensional model. The item identifier may be a name set by a person when registering the virtual item on a network platform, or a string automatically assigned by a system. Each virtual item (or each group of virtual items) corresponds to one item identifier. Specifically, a user may perform image acquisition on all prepared subjects (such as game cards) in advance and extract feature information, then associate the extracted feature information with the item identifier of the virtual item that the feature information refers to, and store the association (or information about the association relationship). In this way, the corresponding item identifier may be determined according to the feature information.

1-3. Obtain the Corresponding Virtual Item from a Stored Virtual Item Library According to the Item Identifier.

In an example embodiment, the user may set an item identifier for each designed virtual item in advance, and store an association between the item identifier and the virtual item in a virtual item library.

(4) Second Determining Module 40

The second determining module 40 is configured to determine coordinate information of each virtual item according to the subject information and the captured image.

Figure 3B:
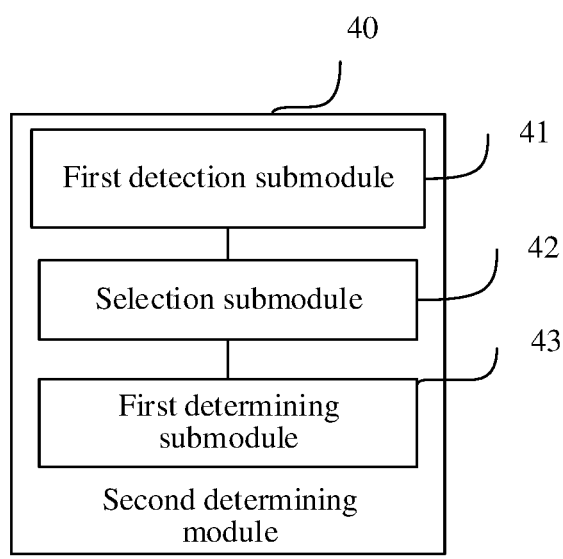
FIG. 3b is a schematic structural diagram of a second determining module according to an example embodiment.

For example, referring to FIG. 3*b*, the second determining module 40 may specifically include a first detection submodule 41, a selection submodule 42, and a first determining submodule 43.

The first detection submodule 41 is configured to detect a display position of the subject in the captured image.

In an example embodiment, the display position may be a relative position from an upper boundary, a lower boundary, a left boundary and a right boundary of the captured image. Because the projection of the subject in the captured image is a pixel region instead of a single pixel point, a display position of a center of the pixel region may be used to represent the display position of the subject. This is merely an example and any other manners may also be used, and the disclosure is not limited herein.

The selection submodule 42 is configured to select a target subject from the at least one subject according to the display position.

In an example embodiment, the target subject may be selected according to a predetermined criterion. For example, a subject that is farthest from or closest to a fixed point may be determined as the target subject by the selection submodule 42. The fixed point, for example but not limited to, may be a top left vertex, a center point, a bottom right vertex or the like, and an subject located at a boundary may be selected as the target subject.

For example, the selection submodule 42 may be further configured to:

obtain a subject of which the display position is closest to a preset edge of the captured image; and use the obtained subject as the target subject.

In an example embodiment, the preset edge may be any edge set by the user, such as a left edge, a right edge, an upper edge, or a lower edge.

The first determining submodule 43 is configured to determine the coordinate information of each virtual item according to the target subject and the display position.

For example, the first determining submodule 43 may be specifically configured to:

create a three-dimensional coordinate system with the display position of the target subject as a coordinate origin; and obtain coordinate information of each display position in the three-dimensional coordinate system as the coordinate information of the corresponding virtual item.

In an example embodiment, the three-dimensional coordinate system may be created by using the display position of the target subject as a coordinate origin and using a plane in which the captured image is located as a plane in which two coordinate axes (such as an X axis and a Y axis) are located. Then, corresponding three-dimensional coordinate values are determined according to projection positions of each display position relative to the X axis, the Y axis and a Z axis, and the three-dimensional coordinate values are used as the coordinate information of the virtual item. A value of a third coordinate axis (such as the Z axis) in each piece of the coordinate information may be zero.

(5) Generation Module 50

The generation module 50 is configured to generate a virtual scene according to the coordinate information, the virtual item, and the captured image.

For example, the generation module 50 may be configured to:

superimpose the corresponding virtual item on the captured image according to the coordinate information to generate the virtual scene.

In an example embodiment, the virtual scene refers to a new image generated in a specified common space coordinate system after transformation performed on a virtual image and a real image. The common space coordinate system mainly refers to the created three-dimensional coordinate system, and the transformation may include superposition. The virtual item in the virtual scene may be directly or indirectly superimposed on the captured image, which is mainly according to an actual gaming focus. If the focus is on real environment experience, direct superposition is used. If the focus is on a presentation of real interactions in the virtual world, indirect superposition is used.

Figure 3C:
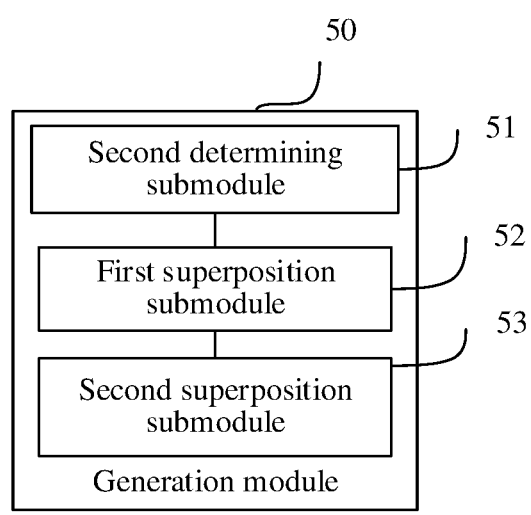
FIG. 3c is a schematic structural diagram of a generation module according to an example embodiment.

For example, referring to FIG. 3*c*, when the virtual item is superimposed indirectly, the generation module 50 may specifically include a second determining submodule 51, a first superposition submodule 52, and a second superposition submodule 53.

The second determining submodule 51 is configured to determine a target scene image in a stored scene image library according to the item identifier.

In an example embodiment, scene images of the scene image library are normally designed in advance according to game content, and mainly serve as game backgrounds. Different games may have different scene images. In different games, the virtual items required are different, and each virtual item may be identified by the item identifier. Therefore, a scene image of a currently running game may be determined according to the item identifier of the virtual item.

The first superposition submodule 52 is configured to superimpose the target scene image on the captured image according to the coordinate information.

In an example embodiment, a size and a superposition position of the target scene image may be adjusted according to coordinate information of a virtual item located at an edge, so as to ensure that each virtual item is located above the target scene image.

The second superposition submodule 53 is configured to superimpose the corresponding virtual item on the target scene image according to the coordinate information.

In an example embodiment, a corresponding position of each piece of coordinate information on the target scene image may be first determined, and then the corresponding virtual item is superimposed at the corresponding position.

After the virtual scene is generated, the virtual scene may be further presented to the user, so that the user can perform an interaction according to the presented image. When the user stands in different positions, visual angles of the user are different as well. When the virtual scene is presented to the user, it is required to flexibly adjust placement directions of the virtual item and the target scene image according to the visual angle of each user, so as to deepen immersive feelings of the users. The visual angle of each user may be obtained from the orientation of the respective acquired background image.

Figure 3D:
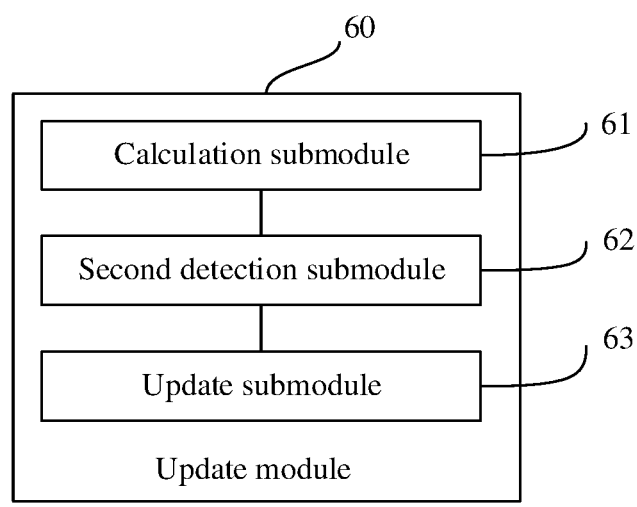
FIG. 3d is a schematic structural diagram of an update module according to an example embodiment.

In addition, after the virtual scene is presented to the user, it is also required to track the movement of each subject in real time and update the corresponding virtual scene according to the movement. That is, referring to FIG. 3d, the image processing apparatus may further include an update module 60. The update module 60 may specifically include a calculation submodule 61, a second detection submodule 62, and an update submodule 63.

The calculation submodule 61 is configured to obtain, after the second superposition submodule 53 superimposes the corresponding virtual item on the target scene image according to the coordinate information, differences between each piece of the coordinate information and the remaining pieces of the coordinate information to obtain a difference set, where each piece of the coordinate information corresponds to one difference set.

The second detection submodule 62 is configured to detect variations of differences in each difference set.

The update submodule 63 is configured to update the virtual scene based on the variations.

In an example embodiment, the difference is a coordinate difference between two virtual items, and the variation of the difference may reflect the relative movement between the two virtual items, such as relative movement or relative rotation. Once the detected variation is not zero, it is required to fix the game scene according to coordinate information of a virtual item that has not moved and update the virtual item according to the coordinate information of the virtual item that has moved.

For example, when a presentation of the target scene image needs to be fixed according to the virtual item that has not moved, the update submodule 63 may be specifically configured to:

obtain a quantity of differences having variations equal to zero in each difference set;

determine a target difference set in the difference sets according to the counted quantity; and fix the target scene image in the virtual scene by using coordinate information corresponding to the target difference set as an anchor.

In an example embodiment, that the variation is equal to 0 (that is, no relative movement occurs) may be based on two situations: both of the two virtual items move at an equal distance simultaneously; or neither of the two virtual items moves. In this case, the virtual items that have not moved may further be determined according to the quantity of the differences having the variations equal to 0. For example, a difference set having top ranking quantities (that is, having the highest quantity of differences having variations equal to zero relative to most of the virtual items) may be determined as the target difference set, a virtual item corresponding to the target difference set is determined as the virtual item that has not moved, and coordinates of the virtual item are used as anchors to continue to fix the target scene image.

When the virtual item needs to be updated according to the coordinate information of the virtual item that has moved, the update submodule 63 may be specifically configured to:

obtain all differences with variations greater than zero in each difference set;

determine whether a difference less than or equal to a preset threshold exists in all the obtained differences;

determine, in a case that the difference less than or equal to the preset threshold exists, the coordinate information corresponding to the difference less than or equal to the preset threshold as interactive object coordinate information, and determine an item identifier corresponding to the interactive object coordinate information as an interactive object identifier; and update the virtual item superimposed on the target scene image according to the interactive object coordinate information and the interactive object identifier.

In an example embodiment, not all the virtual items that have moved need to be updated, and updates are only necessary if there is an interaction between two virtual items. The preset threshold is mainly used to define an interactive status and a non-interactive status, and a specific value may be determined according to a predetermined criterion. The interactive modes in the interactive status may include approaching, zooming, colliding, rotating and the like. Different interactive modes normally indicate different interactive instructions. For example, approaching may indicate attack, zooming may indicate withdrawal, and rotating may indicate defense. The same interactive modes may also indicate different interactive instructions in different games.

When a distance between two virtual items is within the preset threshold, the two virtual items may be defined as being in an interactive status. In this case, an interactive mode needs to be further determined according to the distance value between both parties, and the virtual item needs to be updated according to the interactive mode. That is, the update submodule 63 may be configured to:

4-1: Obtain, According to the Interactive Object Identifier, an Item Parameter Corresponding to the Virtual Item.

In an example embodiment, the item parameter mainly includes an attribute parameter of the virtual item, for example, an attack range value, an attack damage value, a defense value, a life value of different characters in the game.

4-2: Calculate an Interactive Value According to the Item Parameter and the Interactive Object Coordinate Information.

For example, operation 4-2 may specifically include the following operations:

determining a target interactive function according to the difference less than or equal to the preset threshold; and calculating the interactive value according to the target interactive function, the item parameter, and the interactive object coordinate information.

In an example embodiment, different distances between two virtual items correspond to different interactive modes, and each interactive mode has a specified interactive function to calculate the interactive value. The interactive functions are generally preset by the user and stored in a database after being associated with a specified distance range, so that the corresponding interactive function may be determined according to the distance subsequently.

4-3: Update the Corresponding Item Parameter According to the Interactive Value to Update the Virtual Item.

In an example embodiment, a method for updating the item parameter may be determined according to a predetermined criterion, for example, a simple addition and subtraction method, that is, adding or subtracting the interactive value on the item parameters. Normally, different interactive values have different interactive influences on virtual items, and a larger interactive value indicates a greater interactive influence. Different interactive influences lead to different interactive results including defeat, death, blood loss in the game, and each interactive result needs to be determined according to updated item parameters. For example, if a life value of a virtual item is 0 after interaction, the interactive result of the virtual item is death of the virtual item. In addition, for different interactive results, different images of the virtual item may be presented. For example, a death effect may be generated around the virtual item when the interactive result is death, and a blood box above the virtual item may be changed when the interactive result is blood loss.

In specific implementations, the foregoing units may be implemented as independent entities, and may also be combined freely and implemented as the same entity or several entities. For specific implementations of the foregoing units, reference may be to the foregoing method embodiments, and it is not described herein again.

As can be learned from the above, in the image processing apparatus provided in an example embodiment, the obtaining module 10 obtains a captured image, the extraction module 20 extracts subject information of at least one subject from the captured image, the first determining module 30 determines a corresponding virtual item according to the subject information of each subject, the second determining module 40 determines coordinate information of each virtual item according to the subject information and the captured image of each subject, and the generation module 50 generates a virtual scene according to the coordinate information, the virtual item, and the captured image, to present the corresponding virtual item in a real scene according to relative positional relationships of a plurality of real items. In this way, construction of large game scenes is implemented, game interactive modes are enriched, and high flexibility is provided.

The example embodiments of the disclosure further provide an image processing system, including any image processing apparatus provided by the example embodiments. The image processing apparatus may be integrated in an electronic apparatus.

The electronic apparatus may obtain a captured image; extract subject information of at least one subject from the captured image; determine a corresponding virtual item according to the subject information of each subject; determine coordinate information of each virtual item according to the subject information of each subject and the captured image; and generate a virtual scene according to the coordinate information, the virtual item, and the captured image.

For specific implementations of the foregoing devices, reference may be made to the foregoing embodiments, and it is not described herein again.

Because a web page authorization system may include any image processing apparatus provided by the example embodiments, the web page authorization system may implement beneficial effects that can be implemented by any image processing apparatus provided by the example embodiments. For the details, the foregoing embodiments may be referred to, and the repetitive details are not described herein.

Figure 4:
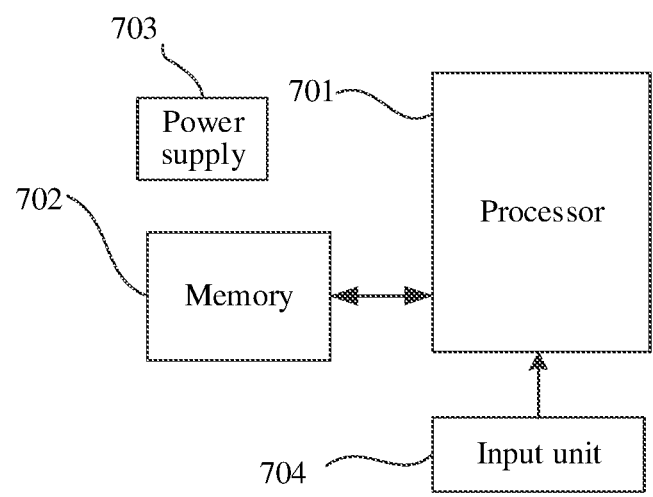
FIG. 4 is a schematic structural diagram of an electronic apparatus according to an example embodiment.

FIG. 4 is a schematic structural diagram of the electronic apparatus according to an example embodiment.

The electronic apparatus according to an example embodiment in FIG. 4 may include components such as a processor 701 with one or more processing cores, a memory 702 with one or more computer readable storage mediums, a power supply 703, and an input unit 704. A person skilled in the art may understand that the structure of the electronic apparatus shown in FIG. 4 does not constitute a limitation to the electronic apparatus, and the electronic apparatus may include more or fewer components than those shown in the figure, or some components may be combined, or a different component deployment may be used.

The processor 701 is configured to control components of the electronic apparatus, and connects some or all parts of the electronic apparatus by using various kinds of interfaces and lines. By running or executing software programs and/or modules stored in the memory 702 and invoking data stored in the memory 702, the processor 701 performs various functions of the electronic apparatus and data processing to overall monitor the electronic apparatus. Optionally, the processor 701 may include one or more processing cores. In an example embodiment, an application processor and a modem processor may be integrated into the processor 701. The application processor mainly processes an operating system, a user interface, an application and the like, and the modem processor mainly processes wireless communications. It can be understood that the modem processor may not be integrated into the processor 701.

The memory 702 may be configured to store a software program and a module. The processor 701 runs the software program and the module stored in the memory 702 to implement various functional applications and data processing. The memory 702 may mainly include a program storage area and a data storage area. The program storage area may store an operating system, an application required by at least one function (such as a sound playback function and an image display function) and the like. The data storage area may store data created according to the use of the electronic apparatus, and the like. In addition, the memory 702 may include a high speed random access memory, and may also include a non-volatile memory such as at least one magnetic disk storage device, a flash memory, or another volatile solid-state storage device. The memory 702 may further include a memory controller, so as to provide access of the processor 701 to the memory 702.

The electronic apparatus further includes the power supply 703 for supplying power to the components. In an example embodiment, the power supply 703 may be logically connected to the processor 701 by using a power management system, thereby implementing functions, such as charging, discharging and power consumption management, by using the power supply management system. The power supply 703 may further include one or more direct current or alternating current power supplies, a re-charging system, a power failure detection circuit, a power supply converter or inverter, a power supply state indicator, and any other components.

The electronic apparatus may further include the input unit 704. The input unit 704 may be configured to receive input digit or character information, and generate a keyboard, mouse, joystick, optical, or track ball signal input related to the user setting and function control.

Although not shown in the figure, the electronic apparatus may further include a display unit, which is not further described herein. Specifically, in an example embodiment, in order to implement various functions, the processor 701 in the electronic apparatus loads executable files corresponding to one or more application processes into the memory 702 according to the following computer readable instructions:

obtaining a captured image;

extracting subject information of at least one subject from the captured image;

determining a corresponding virtual item according to the subject information of each subject;

determining coordinate information of each virtual item according to the subject information of each subject and the captured image; and generating a virtual scene according to the coordinate information, the virtual item, and the captured image.

The electronic apparatus may implement the beneficial effects that can be implemented by any image processing apparatus provided by the example embodiments. For the details, the foregoing embodiments may be referred to, and repetitive details are not described herein.

A person of ordinary skill in the art may understand that all or some of the operations of the methods of the foregoing embodiments may be implemented by computer readable instructions, or by using the computer readable instructions to control relevant hardware. The computer readable instructions may be stored in a computer readable storage medium, and loaded and executed by the processor.

Therefore, the example embodiments provide a non-volatile computer readable storage medium storing a plurality of computer readable instructions. The computer readable instructions can be loaded by the processor to perform any operation of the image processing method provided by the example embodiments. The storage medium may include: a read-only memory (ROM), a random access memory (RAM), a magnetic disk, an optical disc, or the like.

Because the computer readable instructions stored in the storage medium may perform any operation of the image processing method provided by the example embodiments, the beneficial effects that can be implemented by any image processing apparatus provided by the example embodiments are implementable. For the details, the foregoing embodiments may be referred to, and repetitive details are not described herein.

The image processing method and apparatus, storage medium, electronic apparatus, and system are described in detail above. The principles and implementations of the disclosure are described in the specification by using specific examples, and the descriptions of the foregoing embodiments are merely used to help understand the method of the disclosure and the main idea thereof. The foregoing embodiments are merely intended for describing the technical solutions, but not for limiting the disclosure. Although the disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments.

What is claimed is:

1. An image processing method, performed by an electronic apparatus, the method comprising:

obtaining a captured image;

extracting subject information of a subject, among at least one subject, from the captured image;

determining a virtual item corresponding to the subject according to the subject information of the subject;

determining coordinate information of the virtual item according to the subject information of the subject and the captured image; and generating and superimposing a virtual scene including the virtual item on the captured image according to the coordinate information, wherein, when a plurality of virtual items are included in the virtual scene, the method further comprises:

tracking movement of each subject in the captured image, and determining, based on a distance being a preset threshold distance or less between two virtual items corresponding to a first subject and a second subject included in the captured image by reflecting a relative movement between the first subject and the second subject, that the two virtual items corresponding to the first subject and the second subject enter an interactive mode with each other; and updating the two virtual items corresponding to the first subject and the second subject in the virtual scene according to the interactive mode, the updating being not performed in a non-interactive mode of the two virtual items.

2. The image processing method according to claim 1, wherein the determining the virtual item comprises:

extracting feature information from the subject information;

determining, according to the feature information, an item identifier corresponding to the subject; and obtaining, from a stored virtual item library, the virtual item corresponding to the subject according to the item identifier.

3. The image processing method according to claim 1, wherein the determining the coordinate information of the virtual item comprises:

detecting a display position of the at least one subject in the captured image;

selecting a target subject from the at least one subject according to the display position; and determining the coordinate information of the virtual item according to the target subject and the display position.

4. The image processing method according to claim 3, wherein the selecting the target subject comprises:

determining as the target subject, from among the at least one subject, a subject of which the display position is closest to a preset edge of the captured image.

5. The image processing method according to claim 3, wherein the determining the coordinate information of the virtual item comprises:

creating a three-dimensional coordinate system based on the display position of the target subject as a coordinate origin; and obtaining coordinate information of each display position of the at least one subject in the three-dimensional coordinate system as the coordinate information of the virtual item.

6. The image processing method according to claim 2, wherein the superimposing comprises:

determining a target scene image in a stored scene image library according to the item identifier;

superimposing the target scene image on the captured image according to the coordinate information; and superimposing the virtual item on the target scene image according to the coordinate information.

7. The image processing method according to claim 6, further comprising, after the superimposing the virtual item on the target scene image:

obtaining, for each piece of the coordinate information of the virtual item, a difference set based on differences between each piece of the coordinate information and remaining pieces of the coordinate information;

detecting variations of the differences in each difference set; and updating the virtual scene based on the variations.

8. The image processing method according to claim 7, wherein the updating the virtual scene comprises:
obtaining a number of an occurrence in which the variations of the differences in each difference set is equal to zero;
determining a target difference set, from among a plurality of difference sets for the virtual item, according to the obtained number of the occurrence; and
fixing the target scene image in the virtual scene by using coordinate information corresponding to the target difference set as an anchor.

9. The image processing method according to claim 7, wherein the updating the virtual scene comprises:
obtaining differences having variations greater than zero in each difference set;
determining whether a difference less than or equal to a preset threshold exists in the obtained differences;
determining, based on the difference ewxisting, coordinate information corresponding to the difference less than or equal to the preset threshold as interactive object coordinate information, and determining an item identifier corresponding to the interactive object coordinate information as an interactive object identifier; and
updating the virtual item superimposed on the target scene image according to the interactive object coordinate information and the interactive object identifier.

10. The image processing method according to claim 9, wherein the updating the virtual item superimposed on the target scene image comprises:
obtaining, according to the interactive object identifier, an item parameter corresponding to the virtual item;
calculating an interactive value according to the item parameter and the interactive object coordinate information; and
updating the item parameter according to the interactive value to update the virtual item.

11. The image processing method according to claim 10, wherein the calculating the interactive value comprises:
determining a target interactive function according to the difference less than or equal to the preset threshold; and
calculating the interactive value according to the target interactive function, the item parameter, and the interactive object coordinate information.

12. An electronic apparatus:
at least one memory operable to store program code; and
at least one processor operable to read the program code and operate as instructed by the program code, the program code comprising:
obtaining code configured to cause at least one of the at least one processor to obtain a captured image;
extracting code configured to cause at least one of the at least one processor to extract subject information of a subject, among at least one subject, from the captured image;
first determining code configured to cause at least one of the at least one processor to determine a virtual item corresponding to the subject according to the subject information of the subject;
second determining code configured to cause at least one of the at least one processor to determine coordinate information of the virtual item according to the subject information of the subject and the captured image; and
generating code configured to cause at least one of the at least one processor to generate and superimpose a virtual scene including the virtual item on the captured image according to the coordinate information,
wherein, when a plurality of virtual items are included in the virtual scene, the generating code further causes at least one of the at least one processor to:
track movement of each subject in the captured image, and determine, based on a distance being a preset threshold distance or less between two virtual items corresponding to a first subject and a second subject included in the captured image by reflecting a relative movement between the first subject and the second subject, that the two virtual items corresponding to the first subject and the second subject enter an interactive mode with each other; and
update the two virtual items corresponding to the first subject and the second subject in the virtual scene according to the interactive mode, updating being not performed in a non-interactive mode of the two virtual items.

13. The electronic apparatus according to claim 12, wherein the first determining code comprises:
code configured to cause at least one of the at least one processor to extract feature information from the subject information;
code configured to cause at least one of the at least one processor to determine, according to the feature information, an item identifier corresponding to the subject; and
code configured to cause at least one of the at least one processor to obtain, from a stored virtual item library, the virtual item corresponding to the subject according to the item identifier.

14. The electronic apparatus according to claim 12, wherein the second determining code comprises:
code configured to cause at least one of the at least one processor to detect a display position of the at least one subject in the captured image;
code configured to cause at least one of the at least one processor to select a target subject from the at least one subject according to the display position; and
code configured to cause at least one of the at least one processor to determine the coordinate information of the virtual item according to the target subject and the display position.

15. A non-transitory computer readable storage medium, storing a plurality of computer readable instructions executable by one or more processors to perform:
obtaining a captured image;
extracting subject information of a subject, among at least one subject, from the captured image;
determining a virtual item corresponding to the subject according to the subject information of the subject;
determining coordinate information of the virtual item according to the subject information of the subject and the captured image; and
generating and superimposing a virtual scene including the virtual item on the captured image according to the coordinate information,
wherein the plurality of computer readable instructions are executable by the one or more processors to further perform, when a plurality of virtual items are included in the virtual scene:
tracking movement of each subject in the captured image, and determining, based on a distance being a preset threshold distance or less between two virtual items corresponding to a first subject and a second subject included in the captured image by reflecting a relative movement between the first subject and the second subject, that the two virtual items corresponding to the first subject and the second subject enter an interactive mode with each other; and updating the two virtual items corresponding to the first subject and the second subject in the virtual scene according to the interactive mode, the updating being not performed in a non-interactive mode of the two virtual items.

16. The storage medium according to claim 15, wherein, in determining the virtual item, the plurality of computer readable instructions are executable by the one or more processors to further perform:

extracting feature information from the subject information;

determining, according to the feature information, an item identifier corresponding to the subject; and obtaining, from a stored virtual item library, the virtual item according to the item identifier.

17. The storage medium according to claim 15, wherein, in determining the coordinate information of the virtual item, the plurality of computer readable instructions are executable by the one or more processors to further perform:

detecting a display position of the at least one subject in the captured image;

selecting a target subject from the at least one subject according to the display position; and determining the coordinate information of the virtual item according to the target subject and the display position.

* * * * *